No. 638,766. Patented Dec. 12, 1899.
A. SINZHEIMER.
NECKBAND FOR SHIRTS.
(Application filed Feb. 28, 1899.)
(No Model.) 2 Sheets—Sheet 1.
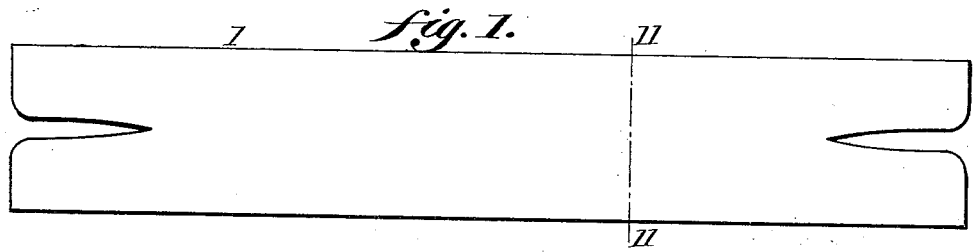
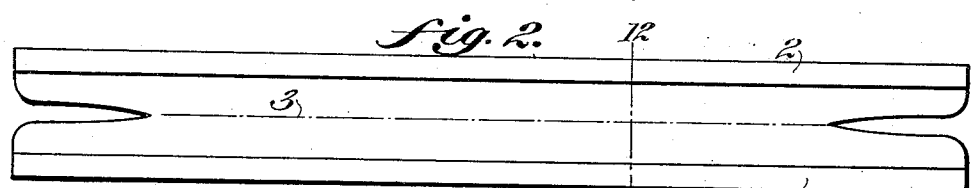
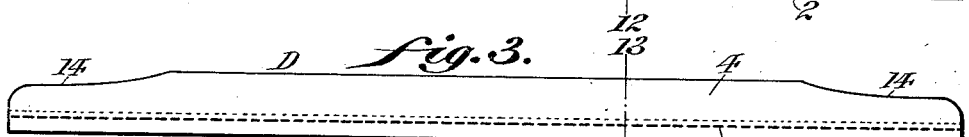
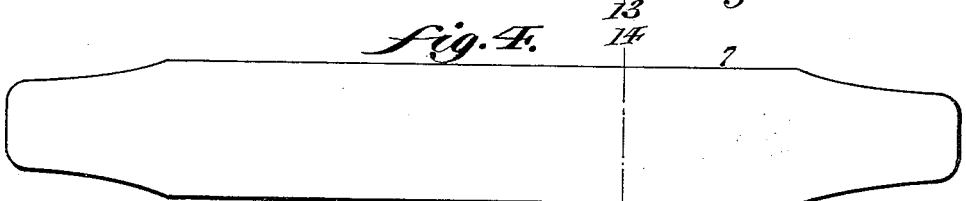
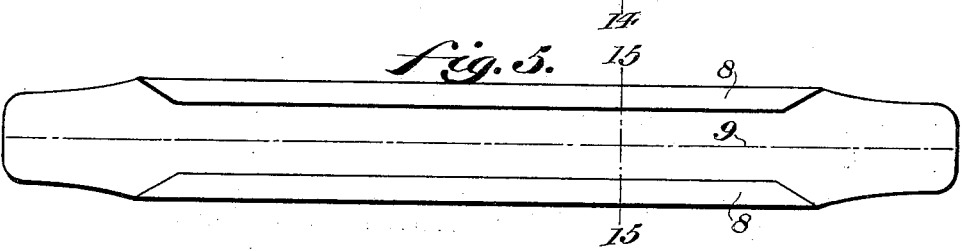
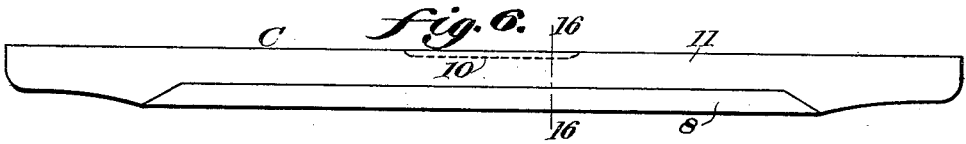
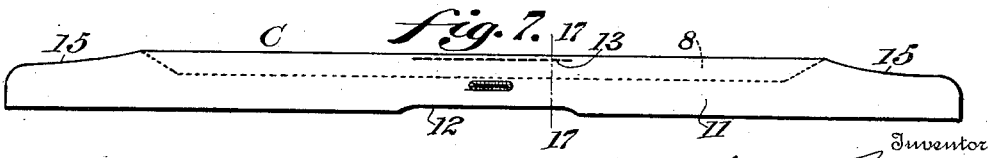
Witnesses
L. Douville,
Q. F. Eagle.
Inventor
Alexander Sinzheimer
By Wiedersheim & Fairbanks
Attorneys No. 638,766. Patented Dec. 12, 1899.
A. SINZHEIMER.
NECKBAND FOR SHIRTS.
(Application filed Feb. 28, 1899.)
(No Model.) 2 Sheets—Sheet 2.
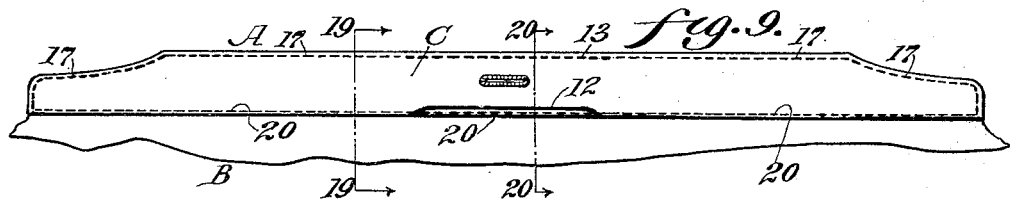
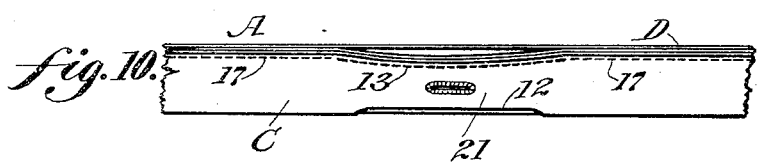
 
 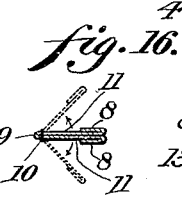 
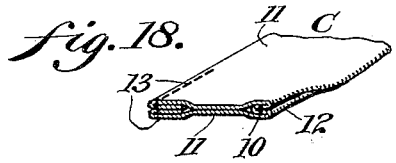
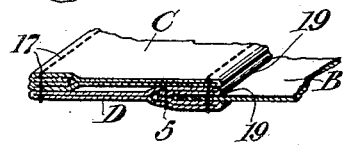 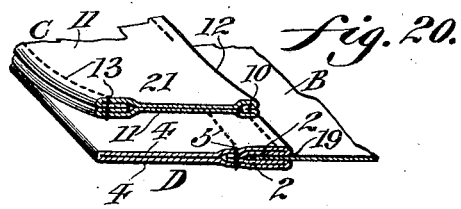
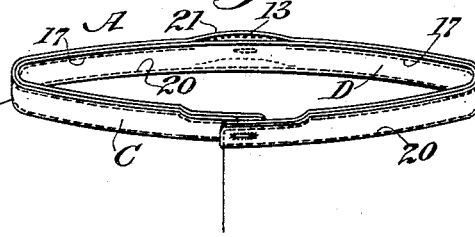
Witnesses
Inventor
Alexander Sinzheimer
By Diederstein & Fairbanks
Attorneys
THE NORRIS PETERS CO., PHOTO-LITHO., WASHINGTON, D. C.

UNITED STATES PATENT OFFICE.

ALEXANDER SINZHEIMER, OF PHILADELPHIA, PENNSYLVANIA.

NECKBAND FOR SHIRTS.

SPECIFICATION forming part of Letters Patent No. 638,766, dated December 12, 1899.

Application filed February 28, 1899. Serial No. 707,150. (No model.)

*To all whom it may concern:*

Be it known that I, ALEXANDER SINZHEIMER, a citizen of the United States, residing in the city and county of Philadelphia, State of Pennsylvania, have invented a new and useful Improvement in Neckbands for Shirts, which improvement is fully set forth in the following specification and accompanying drawings.

This invention consists of a novel construction in shirt-neckbands of that class wherein a section of an outer portion or strip, midway between the ends thereof, is separate from the main portion of a neckband to form a loop in which the back buttonhole is made, whereby the inner face of the neckband is smooth and unbroken.

The invention further consists in the details of construction hereinafter fully described and specifically claimed.

Figure 1 is a plan view of the blank employed to form the inner strip. Figs. 2 and 3 are plan views showing the development of the blank shown in Fig. 1 to form the inner strip or portion of the neckband. Fig. 4 is a plan view of the blank from which the outer strip is developed. Figs. 5, 6, and 7 are plan views illustrating the development of the blank shown in Fig. 4 into the outer strip. Fig. 8 is a plan view illustrating the manner in which the outer and inner strips are first secured together. Fig. 9 is a plan view showing the completed neckband upon the shirt. Fig. 10 is a plan view of a section of the neckband in detail. Figs. 11, 12, and 13 are sectional views taken, respectively, on the lines 11 11, 12 12, and 13 13 of Figs. 1, 2, and 3. Figs. 14, 15, 16, and 17 are sectional views taken, respectively, on the lines 14 14, 15 15, 16 16, and 17 17 of Figs. 4, 5, 6, and 7. Fig. 18 is a perspective view, on an enlarged scale, of the central portion of the outer strip. Figs. 19 and 20 represent perspective views, on an enlarged scale, with one end thereof in section and taken on the lines 19 19 and 20 20 of Fig. 9. Fig. 21 is a top edge view of a complete collar-band and collar-button. Fig. 22 is a perspective view of the upper portion of the shirt and neckband.

Similar letters and numerals of reference indicate corresponding parts in the figures.

Referring to said drawings, A designates a neckband, and B the neck portion of a shirt to which it is secured. The said neckband A consists, essentially, of an outer strip C (shown completed in Fig. 7) and an inner strip D. (Shown completed in Fig. 3.) The blank 1 in Figs. 1 and 11 is employed to form the inner strip D of the neckband, and its edges are first turned over to form the flap 2, as shown in Figs. 2 and 12, after which said blank 1 is folded longitudinally on a line 3 running through its center, and also shown in dotted lines in Fig. 12. The strip then assumes the shape shown in Figs. 3 and 13, its upper head being formed by the bend between the side pieces 4 thereof, while its lower edge is open and formed by the bends in making the flaps 2. A line of stitching 5, running along the lower edge of the strip close to the inner edges of the flaps 2, as shown in Fig. 13, secures the side pieces 4 and the flaps 2 at the lower edge of the strip to form, in effect, a bifurcated or separated lower edge of said strip D.

In Figs. 4 and 14 the blank 7, forming the strip C, is shown, and the first step in forming said strip is to bend over the edges, forming the flaps 8, as shown in Figs. 5 and 15. The blank is then folded longitudinally on a line 9 running through its center, as shown in said figures, and with the flaps 8 exposed. While in this condition, a line of stitches 10 is run through the central portion of the side adjacent the bend and parallel to the edge thereof, except at the end where the stitches enter and leave, as clearly shown in Fig. 6. The position of the two side pieces 11, formed by bending the blank, are then reversed by bending the blank in the opposite direction, so as to bring the flaps 8 on the inside, as shown in Figs. 7 and 17. These figures clearly indicate the indented or notched portion 12 along the bent edge of the blank caused by the stitches 10, which is effected by narrowing the strip at its central portion. The upper edge of the outer strip is stitched together by stitches 13 opposite this narrowed portion 12. The two strips are then ready to be assembled, and in the particular form of neckband illustrated the end portions thereof are tapered or narrowed, and the blanks for producing this shape, as shown in Figs. 1 and 4, have certain portions cut away, which leave raw edges at the end portion thereof, as indicated by 14 in Fig. 3 and 15 in Fig. 7. The first operation, therefore, in assembling this particular form of blank is to place the strips together, with their outer faces adjacent, and then stitch these raw edges by the stitching 16. The strips are then turned, with the result that the end portions of the neckband are bound. The upper edges of both strips are then stitched together by the stitches 17, except at the inner portion, where the central portion of the outer strip forms the loop, as indicated in Fig. 9. The neckband is then completed and ready for attachment to the neck portion of the shirt and comprises the outer and inner strips C and D, secured together along their upper edges, except at the central portion thereto, but unsecured at their lower edges. The inner strip, however, is provided at its lower edges with the separated portion or bifurcation 19 to receive the upper edge of the neck portion of the shirt and within which said neck portion is secured. In stitching the neckband to the shirt, however, the lower edge of the outer strip is also stitched by the same line of stitching (indicated at 20, Fig. 9) except, however, at the central portion, where the loop 21 is formed, and it will be noted that the lower edge portion of said outer strip being indented or notched at its central portion allows a straight line of stitching to be employed between the ends of the neckband, and thus obviates the necessity of moving the lower edge of the outer strip to prevent it being secured by the stitching 20. It is seen that the bifurcated or separated portion 19 forms a guide that facilitates the sewing of the edge portion of the shirt to the neckband and, furthermore, that it is not necessary to stitch the two strips together transversely at the ends of the loop or central portion 21, since the stitches 17 and 20 are sufficient to hold the strips in the desired position, as will be understood.

In the present state of the art of shirt-making it is desirable to have collar-bands which can be laundered before the collar-band is secured to the shirt. For this reason collar-bands should be of double material at the side where the shirt is to be inserted, so as not to ravel out. It is also desirable to be able to sew the collar-band to the shirt without stopping in the operation and also to do it with one row of stitching; also, that they form a buttonhole-guard. All four of these requirements are met in this collar-band.

In the present case the construction as described is for an open-front shirt, and the loop is formed in the rear of the collar-band, about midway the ends thereof; but of course it will be apparent that the position of the loop may be changed as necessary and the construction varied in order to meet the requirements of open-back or open front and back shirts.

Having thus described my invention, what I claim as new, and desire to secure by Letters Patent, is—

1. A neckband for shirts or like garments, comprising an inner and an outer band, each band being folded upon itself throughout its length and breadth and the edges of which are in alinement, excepting at the center at which point the outer band is narrower than the inner band and being secured to the latter except at its central portion, which is provided with a buttonhole, and constitutes a loop disconnected at both its top and bottom edges from the inner band.

2. A neckband for shirts and like garments, comprising an inner band folded upon itself to form a space or channel to receive the upper edge of the garment, and an outer band secured to the inner band, except at its center which is left disconnected to form a loop, the lower edges of which band are in alinement excepting at the center, at which point the outer band is narrower than the inner band.

3. A neckband for shirts or like garments, comprising an inner band folded centrally to form a continuous space or channel, and an outer band also folded centrally and secured at its edges to the inner band except at its central portion, which is left disconnected at both top and bottom and formed with a buttonhole, the lower edges of the bands being in alinement excepting at the center, at which point the outer band is narrower than the inner band.

ALEXANDER SINZHEIMER.

Witnesses:
JOHN A. WIEDERSHEIM,
WM. C. WIEDERSHEIM.